H. J. MARKIEL.
AUTOMATIC TRAP NEST.
APPLICATION FILED OCT. 28, 1916.

1,253,855.

Patented Jan. 15, 1918.
3 SHEETS—SHEET 1.

Witness
J. E. Nordstrom
H. A. Sandburg

Inventor
Henry J. Markiel
By S. Arthur Baldwin
Attorney

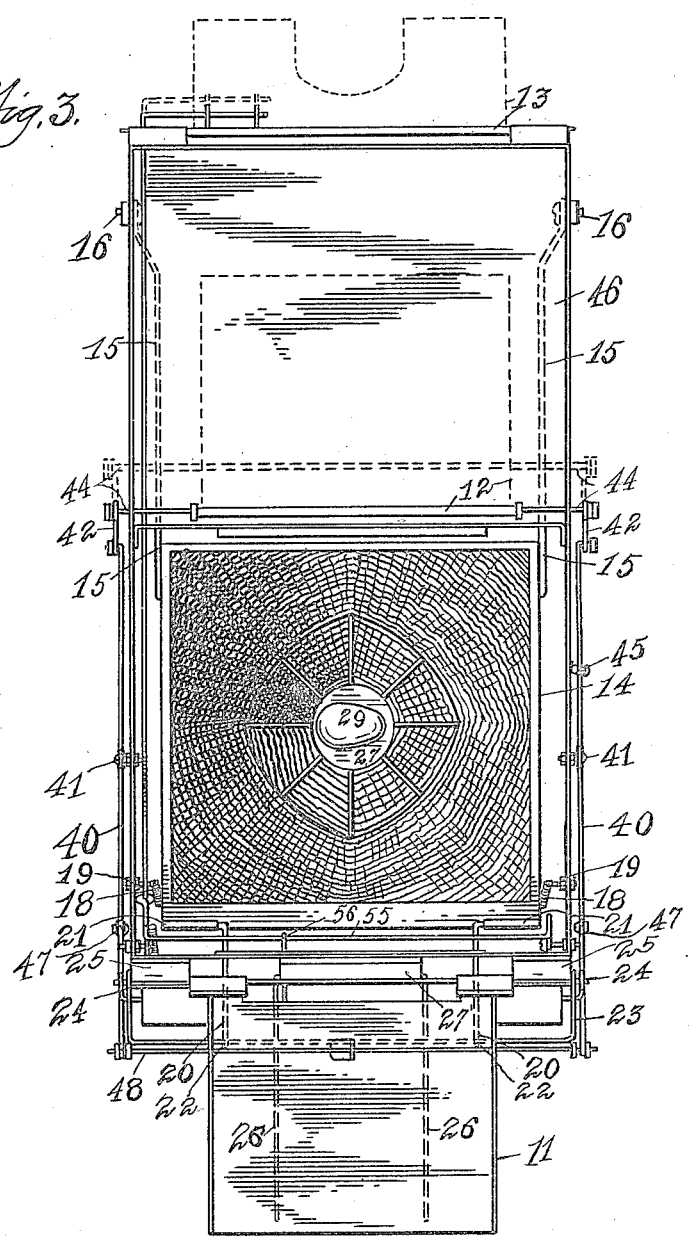
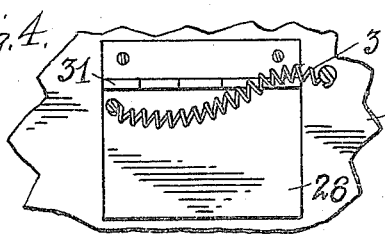

H. J. MARKIEL.
AUTOMATIC TRAP NEST.
APPLICATION FILED OCT. 28, 1916.
1,253,855.
Patented Jan. 15, 1918.
3 SHEETS—SHEET 3.
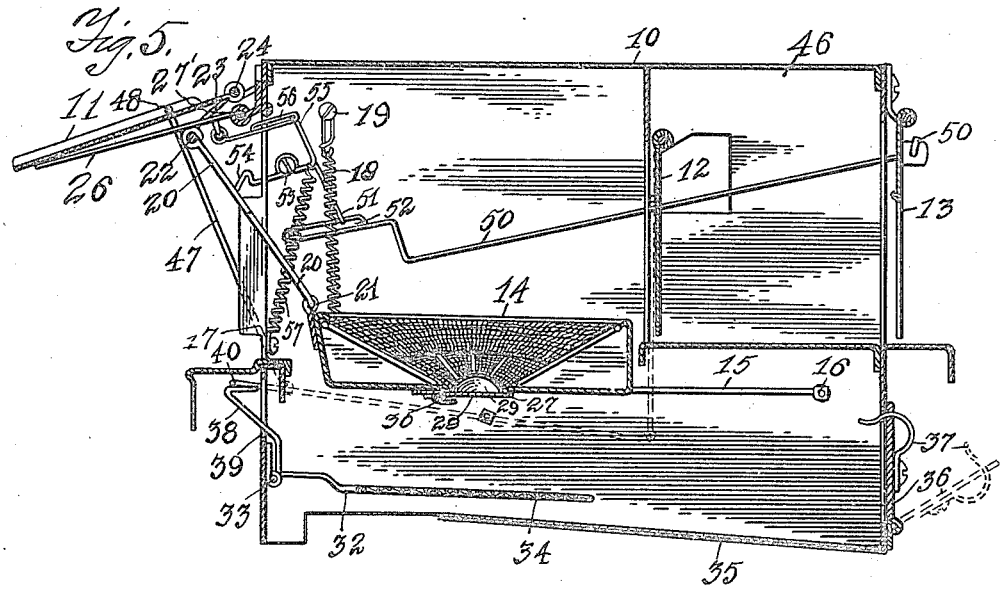
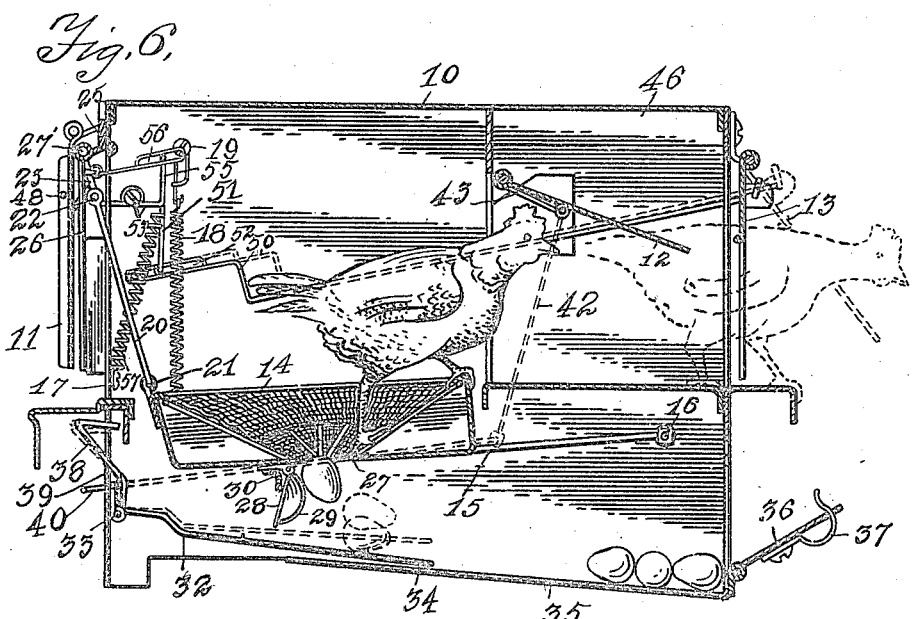

UNITED STATES PATENT OFFICE.

HENRY J. MARKIEL, OF WESTFIELD, NEW YORK.

AUTOMATIC TRAP-NEST.

1,253,855.   Specification of Letters Patent.   Patented Jan. 15, 1918.

Application filed October 28, 1916. Serial No. 128,323.

*To all whom it may concern:*

Be it known that I, HENRY J. MARKIEL, a citizen of the United States, residing at Westfield, in the county of Chautauqua and State of New York, have invented certain new and useful Improvements in Automatic Trap-Nests, of which the following, taken in connection with the accompanying drawings, is a specification.

The invention relates to automatic trap nests for poultry; and the object of the improvement is to provide a simple and easily constructed and actuated mechanism which the hen will operate automatically, provision being made so that she shuts out other fowls when she enters the trap nest and can only find exit from the nest on the inlet side if she does not lay an egg; if she deposits an egg, it passes through the bottom of the nest and is conducted in inclined ways to a receptacle in the lower part of the nest box and automatically actuates mechanism which closes and locks the inlet door and unlocks and opens the outlet door on another side of the nest admitting the hen to a separate inclosure, thereby separating the laying hens from the non-layers; the hen also automatically resets the trap mechanism by passing through a second door on the exit side of the nest, which door is raised by the hen to thereby reset said trap mechanism; and the invention consists in the novel features and combinations hereinafter set forth and claimed.

Figure 1:
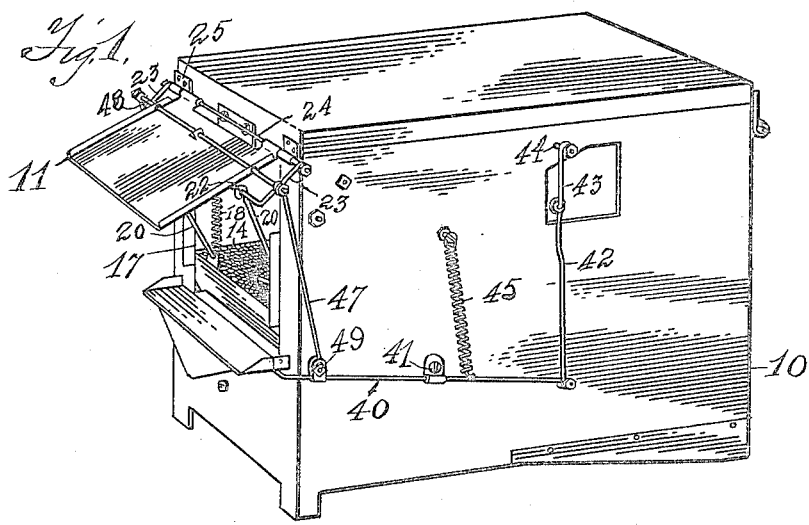
Figure 2:
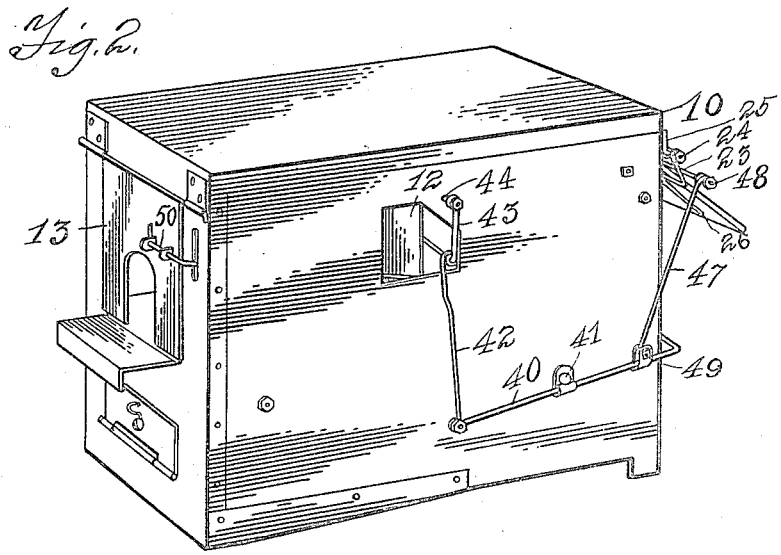

In the drawings, Figure 1 is a perspective view of the nest box, showing both the inlet swing door and the U-shaped swing wire closure for said door in the raised positions ready for the admission of the hen to the nest, the lowered position for said swing wire closure being shown in dotted line. Fig. 2 is a perspective view of the opposite end of the nest box showing the outlet door and the resetting mechanism with the parts in the normally closed position ready for use. Fig. 3 is a plan view of the nest box with the top removed showing the parts in the normal position ready for use, some of the changed positions by the operation of the mechanism being shown in dotted outline. Fig. 4 is a plan view of the underside of the spring trap door for the nest egg which forms a closure for the opening through which the egg passes in the bottom of the nest and showing the closure spring. Fig. 5 is a lengthwise vertical sectional view of the nest box through the inlet and outlet doors showing the construction and arrangement of the parts in the normal set position ready for the admission of the hen to the nest; and Fig. 6 is a similar sectional view of the nest with the hen just leaving the nest after laying an egg; the egg is shown passing through the bottom of the nest thereby permitting a spring to raise the outlet door releasing the hen into the adjoining compartment from which the egress of the hen is shown in dotted outline swinging out the U-shaped second outlet door, the raising of which resets the mechanism for the next hen. Fig. 7 is an elevation of the dummy or false nest egg on its spring trap door in the nest bottom.

Like characters of reference refer to corresponding parts in the several views.

The numeral 10 designates the nest box which has the inlet door 11 and the outlet doors 12 and 13, admitting to and releasing from the nest 14.

The nest 14 is supported at one side upon the rods 15, one at each side, which rods are hinged at 16 against the inner walls of the nest box 10 preferably at a distance from the nest 14 or near the final exit door 13, and each side of the nest 14 adjacent the opening 17 for the inlet door 11 is supported on coil springs 18 which are attached to the nest at their lower ends and to a hook or screw support 19 at their upper ends.

The edge of the nest 14 adjacent the door opening 17 has the links 20 hinged at 21 at their lower ends at each side. The links 20 extend out through the door opening 17 and up to the U-shaped operating wire 23 to which they are hinged at 22; which wire 23 is hinged at each end to a cross wire 24 upon which the swing door 11 is also hinged, said wire 24 being supported in suitable brackets 25. The length of the links 20 is so proportioned that when the nest 14 is in the normal raised position, as shown in Fig. 5, the operating wire 23 is raised.

The office of the wire 23 is to raise and lower a U-shaped closure wire 26 for the door opening 17, which U-shaped wire 26 is hinged at 27 to the front of the nest box 10 over the opening 17 so that it hangs down before the opening 17 in such a manner as to prevent the entering of another hen into the nest box while the door 11 is in the raised position.

It is apparent that when the hen steps into the nest 14 the nest is moved downward and its weight also draws the wire 23 downward by the links 20 into the position shown in Fig. 6, and the U-shaped wire 26 hangs in front of the opening 17 and wire 23 prevents the swinging inward of the closure wire 26 yet permits the outward swinging of said wire so that a hen within the nest box can step out if she so desires without laying an egg. If, however, the hen lays an egg, entirely another set of mechanism will be actuated, as hereinbefore set forth.

The nest 14 is preferably made of coarse fibrous material upon a wire frame which has a hole 27 at the bottom of the nest, which hole 27 is closed by a trap door 28 upon the upper side of which a dummy half nest egg 29 is attached so that it swings freely with the trap door 28. The dummy or false half nest egg 29 is preferably made of light unbreakable material which is not too heavy in weight so that the hen cannot crush it. A coil spring 30 is attached at one end to the underside of the door 28 and at the other to the nest box 14 on opposite sides of the hinge 31 so that the closure spring 30 acts very much the same as a closure door spring, the strength of the spring 30 being apportioned so that it permits the free downward swinging of the trap door 28, as shown in Fig. 6, immediately returning said trap door to its normal position after the egg has passed through.

A frame preferably composed of a U-shaped wire 32 is hinged at 33 to the inner wall of the nest box beneath the nest 14, the space between the U-shaped prongs being covered with woven wire 34 upon which the egg drops as it passes through the hole 27 and rolls down the inclined bottom 35 to the end of the box 10 and the door 36, which door is preferably arranged with a spring catch 37 for the removal of the eggs.

The wire 32 extends up from the hinge 33 and through an opening 39 in the nest box, being given a return bend which forms a trip 38 over which an operating wire 40 operates. The operating wire or lever 40 is pivotally attached to the opposite sides of the box 10 at 41 so that it balances up and down at its front and rear ends, normally balancing upward at its front end, being held in place by the wire trip 38. At its rear end the wire 40 is connected by a link 42 to a U-shaped operating wire 43 which is pivotally attached to a cross wire 44 which pivotally supports the door 12. An operating spring 45 is attached to the operating wire 40 slightly in the rear of the pivotal point 41 on one of the walls of the box 10 to draw upward on the rear end of the wire 40 when said wire is released by the trip wire 38 to thereby raise the door 12, since, as hereinbefore described, the egg dropping upon the frame 32 balances down on said frame sufficiently to withdraw the trip wire 38 and thereby release the operating wire 40 which is balanced upward at its rear end by the spring 45 thereby raising the door 12 and permitting the exit of the hen into the rear compartment 46.

The front door 11 is attached by links 47 at each side and a second cross wire 48 on said door 11 to the operating wire 40 at 49 at each side, and it is apparent that when said operating wire 40 is released by the trip wire 38 and said front end of the wire 40 is balanced downward on the pivotal points 41 by the spring 45 said operating wire 40 will draw downward on the front door 11 thereby closing the opening 17 so that the hen cannot pass through the front of the nest box 10 but must pass out through the door 12 which opens into the compartment 46 and the U-shaped swing door 13 opens from the compartment 46 into a separate inclosure. The hen sees the U-shaped opening in the door 13 which is not sufficiently large for her to pass through and finds as she presses against it that it swings freely outward thereby permitting her exit without trouble or inconvenience.

An operating wire 50 is hinged in projections on the door 13 and extends preferably through openings in the nest box and the partitions therein to the nest compartment and is there attached to an operating wire 51 with a lost motion connection 52. The operating wire 51 is pivotally attached to the inner wall of the nest box at 53 and extends out through an opening in the front wall of the nest box 10 in a trip wire 54 and also extends upward in a cross wire actuating portion 55 which is connected by a link 56 on the U-shaped closure wire 26 to draw said closure wire downward and insure the closure of the opening 17 when the hen steps into the nest 14, the link 56 being attached to the actuating end 55 with sufficient lost motion to permit the outward swinging of the closure wire 26 and permit the hen to pass out, but as hereinbefore stated, not permitting the admission of another hen while there is one on the nest. When the nest returns to the normal raised position the link 20 and wire 23 will automatically raise the U-shaped wire 26 against the underside of the door 11 as shown in Fig. 5 so that it is out of the way of the fowl as it enters the door opening 17.

A spring 57 is attached to the wire 55 in the rear of the pivotal point 53 and at its other end to the inner wall of the front of the box 10 below the wire 55 to normally draw down thereon, so that when the operating wire 23 is drawn downward into the position shown in Fig. 6 by the weight of the hen on the nest, said wire 23 will spring over the spring trip 54, which acts as a latch to hold the wire 23 against its return to the normal position and permitting the dropping of the closure wire 26 before the opening 17. Should the hen deposit the egg and pass on through the doors 12 and 13, the rear door 13 will operate the spring trip 54 to release the wire 23. Should, however, the hen decide not to deposit an egg but passes out of the nest through door opening 17 the prongs of the U-shaped wire 26 are sufficiently close together to engage the shoulder of the hen and the pressing outward of the wires 26 by the hen will unlatch the spring trip 54 thereby releasing the wire 23 and returning the nest 14 and wire 26 to the normal position ready for the entrance of another fowl to the nest.

After the hen has laid her egg she passes outwardly beneath doors 12 and 13 and in lifting the latter door the link 50 effects a rocking of the trip 54 to release the member 20 so that the spring 18 may raise the nest to normal position. As the nest returns to its normal position the link 20 forces element 23 to the position indicated in Fig. 5 carrying the two doors 11 and 26 to their opened position. The door 11 being articulated to lever 40 by link 47, said lever will be lifted above the trip 38 so that when the next hen steps on the nest and depresses it the lever will be arrested by said trip and the tray 32 maintained in its elevated position. To permit of such return or resetting of the parts, it is necessary for the spring 45 to be weaker than the nest spring 18.

It is obvious that the operating wires may be placed on the inner or outer sides of the nest box 10 without departing from my invention; also that a series of nest boxes may be placed side by side and that the operating wires may be so arranged as not to interfere with one another.

I claim as new:—

1. In a trap nest, a nest box having an inlet and an outlet, a nest in the box having an egg opening, a normally opened door for the inlet, a normally closed door for the outlet, a lever pivoted to the box and connected to the doors for operating them simultaneously but to opposite positions, and an egg-operated trip underlying the nest opening and provided with a lever-supporting part for releasably holding the lever inoperative.

2. In a trap nest, a nest box having inlet and outlet openings, a pair of independently movable and normally opened doors for the inlet opening, a pair of independently movable and normally closed doors for the outlet opening, a movably mounted nest in the box having an egg discharge opening, means connecting the nest to one of the inlet doors for closing the same when a hen gets on the nest, means releasably holding the nest-operated door closed, means operable by one of the outlet doors for releasing the nest-operated door, and means operable by an egg passing through the nest opening for closing the second inlet door and opening the second outlet door.

3. In a trap nest, a nest box having inlet and outlet openings, an inner open frame door and an outer solid door for the inlet opening, an inner solid door and an outer open frame door for the outlet opening, a movable nest in the box having an egg discharge opening, means operable by movement of the nest for closing the open frame inlet door, means operable by an egg discharging through the nest opening for closing the solid inlet door and opening the solid outlet door, and means operable by the open frame outlet door for releasing the open frame inlet door.

4. In a trap nest, a nest box having inlet and outlet openings, an inner open frame door and an outer solid door for the inlet opening, an inner solid door and an outer open frame door for the outlet opening, a movable nest in the box having an egg-discharge opening, means operable by movement of the nest under the weight of a hen for closing the open frame inlet door, means operable by an egg falling through the nest opening for closing the solid inlet door and opening the solid outlet door, means for returning the nest to normal position after the hen leaves it and opening the open frame inlet door, and means operable by the open frame outlet door for releasing the latter inlet door from closed position.

5. In a trap nest, a nest box having an inlet and an outlet, a movably supported nest in the box, means tending to return the nest to normal position when moved therefrom, normally opened closure means for the inlet, means under the control of the nest for holding the closure means opened when the nest is normally disposed and permitting the closure means to become operative when the nest is abnormally arranged, a latch for holding the third means inoperative, a closure for the outlet, and means operable by the opening of the outlet closure for rendering the latch inoperative.

6. A trap nest for poultry comprising a nest having a door opening, a spring supported nest in said nest box, a U-shaped wire door hinged above said door opening, a supporting wire for said U-shaped wire door link connected to said nest, and a spring latch for holding said supporting wire in the lowered position whereby said U-shaped wire door may swing across said door opening when the hen is on the nest to prevent other fowls from entering, said U-shaped wire door being released as she raises the same in passing out of said door opening.

7. A trap nest for poultry comprising a nest box having inlet and outlet swing doors, a resiliently supported nest in said nest box, a U-shaped wire door hinged above said inlet door, a supporting wire for said U-shaped wire link connected to said nest to drop said U-shaped wire before said inlet door when a hen steps into said nest to prevent other fowls from entering, spring operating wires connected to said nest and doors to normaly hold the inlet door in the open position and the outlet door in the closed position, and a trip wire actuated by the deposited egg to release said spring operating wires to thereby close said inlet door and open said outlet door.

8. A trap nest for poultry comprising a nest box, a nest compartment in said box having inlet and outlet swing doors, a nest in said compartment having an opening in the bottom for the egg, spring actuated wires connected to said doors to normally hold the inlet door open and the outlet door closed, a trip wire actuated by the egg as it drops through said nest to release said spring actuated wires and thereby close said inlet door and open said outlet door, and a second U-shaped outlet door connected to said inlet door and first outlet door to reset said doors by the raising of said second outlet door.

9. In a trap nest, a nest box having an inlet and an outlet, a movably supported nest in the box, means tending to return the nest to normal position when moved therefrom, normally opened closure means for the inlet, means under the control of the nest for holding the closure means opened when the nest is normally disposed and permitting the closure means to become operating when the nest is abnormally arranged, a latch for holding the third means inoperative, egg-operated means for rendering the inlet closure operative, and hen-operated means for rendering the latch inoperative.

10. In a trap nest, a nest box having an inlet and an outlet, a movably supported nest in the box, means tending to return the nest to normal position when moved therefrom, normally opened closure means for the inlet, means under the control of the nest for holding the closure means opened when the nest is normally disposed and permitting the closure means to become operative when the nest is abnormally arranged, a latch for holding the third means inoperative, an egg-operated trip, and means connected to the inlet closure for rendering the latter operative and releasably held inoperative by the trip, said last means being reëngaged with said trip by said first and third means.

11. In a trap nest, a nest box having an inlet and an outlet, a movably supported nest in the box, means tending to return the nest to normal position when moved therefrom, normally opened closure means for the inlet, means under the control of the nest for holding the closure means opened when the nest is normally disposed and permitting the closure means to become operative when the nest is abnormally arranged, a latch for holding the third means inoperative, an egg-operated trip, means connected to the inlet closure for rendering the latter operative and releasably held inoperative by the trip, said last means being reëngaged with said trip by said first and third means, and hen-operated means for rendering the latch inoperative.

12. In a trap nest, a nest box having an inlet and an outlet, first and second inlet closures, first and second outlet closures, a nest movably supported within the box, means connected to the nest for normally holding the inlet closures opened, means tending to return the nest to normal position when moved therefrom, said nest when moved from normal position moving the first means to inoperative position, lock means to hold the first means inoperative and the nest in abnormal position, means connecting the first inlet closure to the first outlet closure whereby when said inlet closure is operative the outlet closure is inoperative, the second inlet closure moving to operative position when said first means is rendered inoperative, an egg-operated trip for holding the connecting means so that the inlet closure will be maintained inoperative, said connecting means when released and when the nest is abnormally disposed moving the inlet closure to operative, and means operable by the second outlet closure for rendering the lock means inoperative.

13. In a trap nest, a nest box having an inlet and an outlet, an inlet closure, an outlet closure, means for simultaneously closing one closure and opening the other, a movable nest in the box, means for holding the inlet closure opened when the nest is normally disposed, means for maintaining the inlet closure opened when the nest is abnormally disposed, means for rendering the last means inoperative to permit the operation of said first means, and hen-operated means for resetting the parts for another hen.

14. In a trap nest, a nest box having an inlet and an outlet, an inlet closure, an outlet closure, means for simultaneously closing one closure and opening the other, a movable nest in the box, means for holding the inlet closure opened when the nest is normally disposed, means for maintaining the inlet closure opened when the nest is abnormally disposed, egg-operated means for rendering the last means inoperative to permit the operation of said first means, and hen-operated means for resetting the parts for another hen.

In testimony whereof I have affixed my signature in the presence of two witnesses.

HENRY J. MARKKIEL.

Witnesses:
 H. O. SANDBERG,
 J. E. NORDSTROM.

Copies of this patent may be obtained for five cents each, by addressing the "Commissioner of Patents, Washington, D. C."